(12) United States Patent
Huseth et al.

(10) Patent No.: US 8,306,748 B2
(45) Date of Patent: Nov. 6, 2012

(54) LOCATION ENHANCEMENT SYSTEM AND METHOD BASED ON TOPOLOGY CONSTRAINTS

(75) Inventors: Steve Huseth, Plymouth, MN (US); Henry Chen, Beijing (CN); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 499 days.

(21) Appl. No.: 12/573,398

(22) Filed: Oct. 5, 2009

(65) Prior Publication Data

US 2011/0082643 A1  Apr. 7, 2011

(51) Int. Cl.
G01C 21/30 (2006.01)
G01C 21/32 (2006.01)
G01C 21/00 (2006.01)

(52) U.S. Cl. .................. 701/519; 701/411; 701/434

(58) Field of Classification Search .......... 701/409–411, 701/433, 434, 445–448, 469, 518, 519
See application file for complete search history.

(56) References Cited

U.S. PATENT DOCUMENTS

| | | | | |
|---|---|---|---|---|
| 4,812,990 A * | 3/1989 | Adams et al. | ............... | 701/301 |
| 4,862,373 A * | 8/1989 | Meng | ..................... | 701/410 |
| 5,311,173 A * | 5/1994 | Komura et al. | ........ | 340/995.22 |
| 6,167,332 A * | 12/2000 | Kurtzberg et al. | ............ | 701/23 |
| 6,556,943 B2 * | 4/2003 | Kuwahara et al. | ............ | 702/150 |
| 6,801,850 B1 * | 10/2004 | Wolfson | .................. | 701/410 |
| 6,839,628 B1 * | 1/2005 | Tu | ............................ | 701/426 |
| 7,016,781 B1 * | 3/2006 | Wolfson | .................. | 701/410 |
| 7,079,943 B2 * | 7/2006 | Flann et al. | ............... | 701/423 |
| 7,263,375 B2 | 8/2007 | Zavada et al. | | |
| 7,447,593 B2 * | 11/2008 | Estkowski et al. | ............ | 701/301 |
| 7,489,698 B2 | 2/2009 | Blossom et al. | | |
| 7,525,425 B2 | 4/2009 | Diem | | |
| 2006/0224318 A1 * | 10/2006 | Wilson et al. | ............. | 701/213 |
| 2007/0201421 A1 | 8/2007 | Huseth | | |

(Continued)

FOREIGN PATENT DOCUMENTS

EP   0 759 151 B2   2/2007

(Continued)

OTHER PUBLICATIONS

A* search algorithm—Wikipedia, the free encyclopedia http://en.wikipedia.org/wiki/A* search algorithm.

(Continued)

*Primary Examiner* — Khoi Tran
*Assistant Examiner* — Abby Lin
(74) *Attorney, Agent, or Firm* — Kermit D. Lopez; Luis M. Ortiz; Tuesday A. Kaasch

(57) ABSTRACT

A method for enhanced location sensing based on topology constraints. A potential position value and a corresponding probability value with respect to an observed position data of an object within a structure can be calculated utilizing a normal probability distribution function. Thereafter, an optimal route between adjacent observed time periods may be calculated utilizing a heuristic search algorithm. The potential position value and the optimal route can be calculated by accessing a pre-installed topology data associated with the structure. An optimization problem can then be solved to refine the observed position data. The position between a pair of observed time periods can be interpolated and the position of the object before a next observed time can be predicted by interpolation based on the spatial constraints.

17 Claims, 4 Drawing Sheets

U.S. PATENT DOCUMENTS

| | | | |
|---|---|---|---|
| 2007/0288156 A1* | 12/2007 | Neff et al. | 701/202 |
| 2008/0220780 A1 | 9/2008 | Huseth et al. | |
| 2009/0043504 A1 | 2/2009 | Bandyopadhyay et al. | |
| 2009/0051551 A1 | 2/2009 | Pham et al. | |
| 2009/0102642 A1 | 4/2009 | Huseth et al. | |

FOREIGN PATENT DOCUMENTS

WO    WO 02/39063 A1    5/2002

OTHER PUBLICATIONS

Dechter, R. et al., "Generalized Best-First Search Strategies and the Optimality of A*," *Journal of the Association for Computing Machinery* (1985) 32(3):505-536.

Huseth, S. et al., "Enhance Location System with Topology Constraints," (2009) Honeywell.

Hightower, J. et al. "Location Systems for Ubiquitous Computing," *IEEE Computer* (2001) Aug. 57-66.

United States National Building Information Modeling Standard, Version 1—Part 1: Overview, Principles, and Methodologies, National Institute of Building Sciences (2007).

Baldauf, M. et al., "A Survey on Context-Aware Systems," *International Journal of Ad Hoc and Ubiquitous Computing* (2007) 2(4):1-15.

Chen, H. et al., "Extract Topology Structure from the Vector Image," *Honeywell* (2008).

\* cited by examiner

LOCATION ENHANCEMENT SYSTEM AND METHOD BASED ON TOPOLOGY CONSTRAINTS

TECHNICAL FIELD

Embodiments are generally related to location tracking systems and methods. Embodiments also relate in general to the field of computers and similar technologies and, in particular, to software utilized in this field. Embodiments are additionally related to the enhancement of location tracking systems based on topology constraints.

BACKGROUND OF THE INVENTION

In some situations, it may be desirable to determine the location and/or movement of a person or another object within a building or a relatively well defined space such as a home, a hospital, a prison, etc. Large facilities may be subject to incidents or other events that need to be handled rapidly and efficiently by first responders such as, for example, firefighters, police officers, search and rescue teams, and so forth. A common problem encountered by first responders is the difficulty in capturing and transmitting accurate and up to date information to a command center and then providing such information to the first responders who responds on site to the incident. Incident commanders require numerous tools to assist them with managing an incident.

Current first responder systems are unable to accurately locate, track and monitor personnel within a structure during an incident, visualize the location and track the responders on a geospatial map and/or structure, and provide such information in a standard and efficient manner to the interested parties during the incident. A robust and flexible capability is therefore required to assist incident commanders in accurately locating and tracking the responders anywhere in the incident environment. Such a capability is also necessary to permit key personnel to rapidly and effectively deploy, re-deploy, and direct their resources to identified at-risk individuals. Such a capability is also important to permit individuals at risk during life threatening incidents to understand and respond to the consequences of potential threats to their responder resources in real-time during such incidents.

Regardless of the configurations and designs of such first responders systems, there is an overarching requirement and a need for tracking and locating people and assets within a subject structure. Most prior art location tracking techniques attempt to address the problem of automatic location sensing and their accuracy also has improved in recent years, although their effectiveness varies from one system to another. The error between an observed location and a real location, however, is still unavoidable due to various factors such as, for example, signal intervention, various infrastructures, and so on.

Based on the foregoing, it is believed that a need exists for an accurate position location and tracking system and method suitable for a wide range of facilities and in variable environments. A need also exists for an improved method for enhancing location sensing based on topology constraint, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved location tracking system and method for tracking people and assets in variable environments.

It is another aspect of the disclosed embodiments to provide for an accurate position location and tracking system and method for use with a wide range of facilities.

It is a further aspect of the disclosed embodiments to provide for an improved method and system for enhancing location sensing based on topology constraints.

The aforementioned aspects and other objectives and advantages can now be achieved as described herein. A method and system for enhancing location sensing based on topology constraints (e.g., statistical property data, temporal coherence values, spatial constraints, etc) is disclosed. A potential position value and a corresponding probability value with respect to an observed position data of an object (e.g., personnel, equipment, and other tangibles) within a structure can be calculated utilizing a normal probability distribution function (e.g., two-dimensional Gaussian probability distribution function). Thereafter, an optimal route between adjacent observed time periods can be calculated utilizing a heuristic search algorithm (e.g., A* heuristic route search approach). The potential position value and the optimal route can be calculated by accessing pre-installed topology data associated with the structure. An optimization problem can then be solved to refine the observed position data. The position between a pair of observed time periods can be interpolated and the position of the object before a next observed time can be predicted utilizing an interpolation method (e.g., linear interpolation, polynomial interpolation, a Bezier or NURBS interpolation, etc) based on the spatial constraints. The approach described herein can therefore enhance location sensing in order to effectively locate and track an object.

The topology information associated with the structure can be preinstalled and the observed position data can then be obtained. In the context of a graphical and mathematical model, a circle can be drawn in association with observed position data including a center, variance (e.g., a maximum observing error) and radius. Compartments near the observed position data may be determined utilizing the structure topology data and the compartments in which the circle area intersects. A sample point can be selected with respect to each intersected compartment in association with an intersection part and corresponding probability values can be calculated based on the probability distribution function. A time variable can also be added to the position value and the probability value.

The disclosed heuristic search algorithm can split an image obtained from the structure topology data into grids. In the context of an office building or other similar complex, walls and/or cubicles may be marked as a red grid with an unlimited weight value and any open spaces, wherein a person may walk, can be marked with a green grid with a particular weight value. The heuristic search algorithm can search the optimal route between any two grids and then calculate a route length. Probability values and the length of the optimal routes can be utilized to refine the observed position data. The position at any time between the pair of observed time periods can then be obtained by implementing a curve fitting process. The position before the next observed time can also be predicted to improve accuracy. The predicted position can then be located on the fitting curve. The disclosed location system may be further improved by applying a second-order Markov property, adding a moving velocity and a moving direction, and solving the optimization problem.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed embodiments can be utilized to automatically locate, monitor and track objects such as, for example, personnel, equipment, and other tangibles within a structure during an incident. The approach described herein can provide enhanced location information of such an object utilizing topology constraints associated with the structure.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, handheld devices, multi-processor systems, microprocessor-based or programmable consumer electronics, networked PCs, minicomputers, mainframe computers, and the like.

Figure 1:
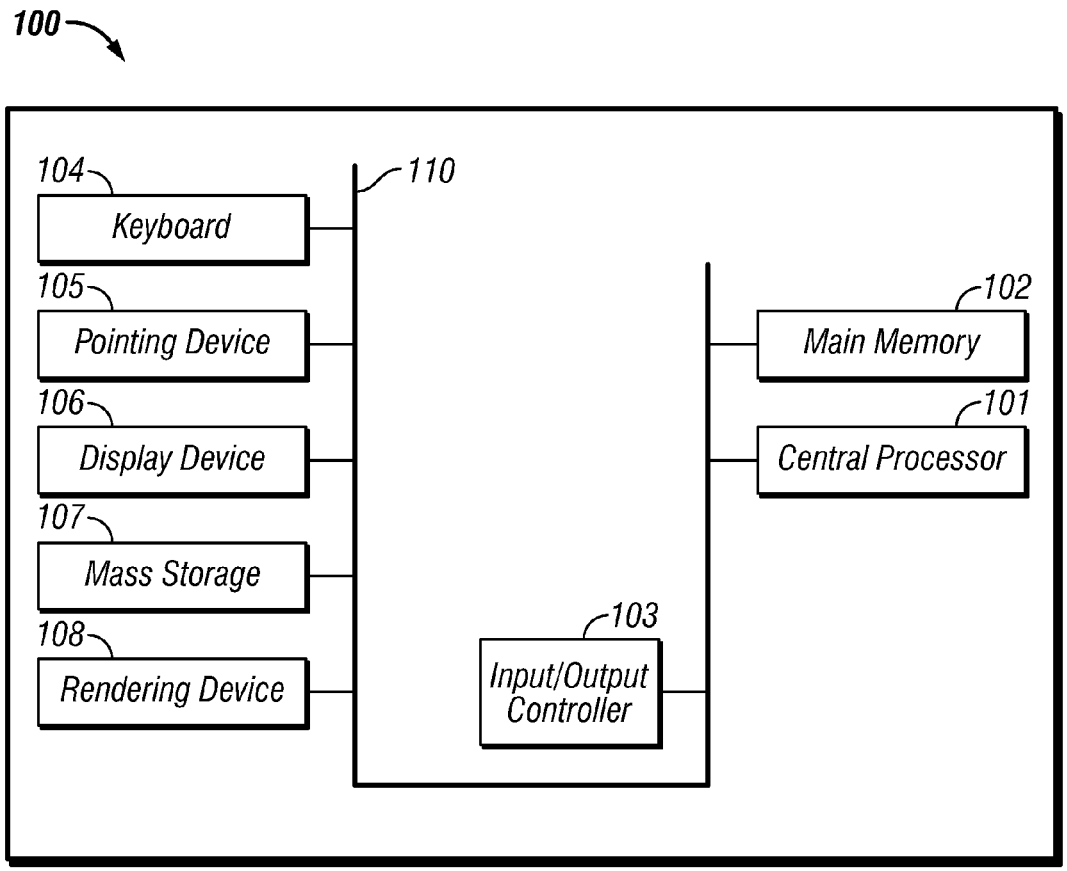
FIG. 1 illustrates a schematic view of a data-processing system in which the disclosed embodiments may be implemented.
Figure 2:
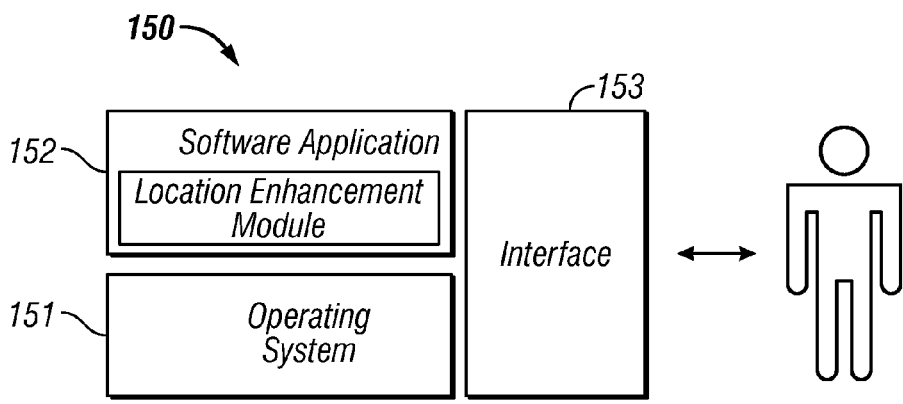
FIG. 2 illustrates a schematic view of a software system including an operating system, application software, and a user interface for carrying out embodiments.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, for example, may be associated with the data-processing system 100 as desired. Note that such a rendering device 108 may constitute, for example, a printer, a copier, fax machine, scanner, and/or other types of rendering components, depending upon design considerations. As illustrated, the various components of the data-processing system 100 communicate through a system bus 110 or similar architecture. It can be appreciated that the data-processing system 100 may be in some embodiments a mobile computing device such as a Smartphone, a laptop computer, and iPhone, etc. In other embodiments, data-processing system 100 may function as a desktop computer, server, and the like, depending upon design considerations.

FIG. 2 illustrates a computer software system 150 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/or application module 153.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program design to assist in the performance of a specific task, such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are potential. For example, rather than a traditional "Windows" system, other operation systems such as, for example, Linux may also be employed with respect to operating system 151 and interface 153. The software application 152 can include a location enhancement module that can be adapted for tracking the location of the object. Module 152 can be adapted for enhancing location sensing based on topology constraint. Software application module 152, on the other hand, can include instructions such as the various operations described herein with respect to the various components and modules described herein such as, for example, the method 400 depicted in FIG. 4.

Figure 3:
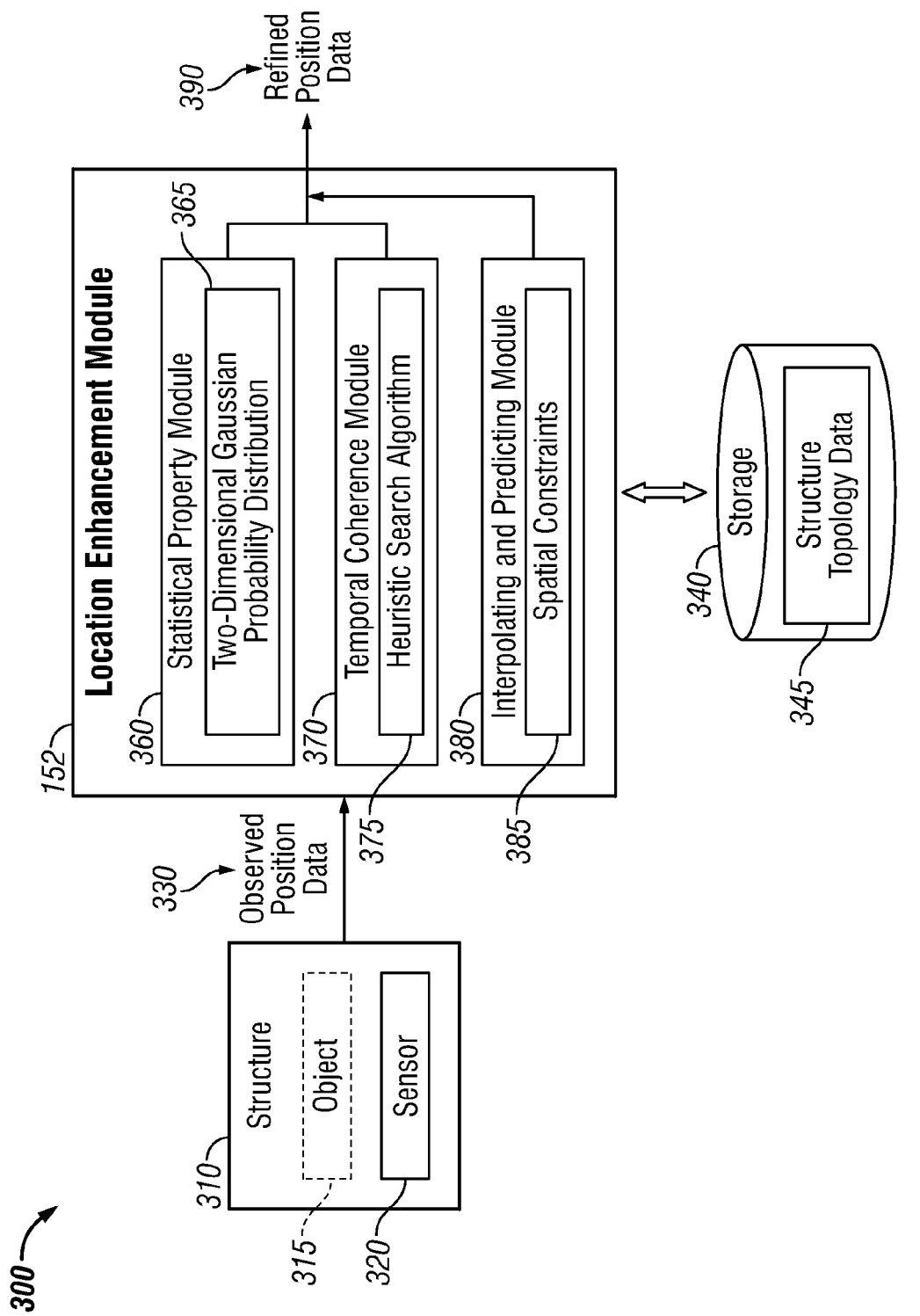
FIG. 3 illustrates a functional block diagram of a location enhancement system, in accordance with the disclosed embodiments.

FIG. 3 illustrates a functional block diagram of a location enhancement system 300, in accordance with an embodiment. Note that in FIGS. 1-6, identical or similar parts are generally indicated by identical reference numerals. The location enhancement system 300 can be utilized for estimating location of an object 315 such as personnel, equipment or other tangibles within a structure 310. Structure 310 may be defined as a confined area such as a building or portion of a building. For example, structure 310 can be a building containing a production line or supply warehouse. Generally, the location enhancement system 300 includes a sensor 320 and the location enhancement module 152. The location enhancement module 152 can be stored within the main memory 102 of the data processing apparatus 100.

According to various embodiments of the invention, location enhancement module 152 may be an electronic device. The electronic device may take multiple forms and may include: a processor; a computer; a personal digital assistant; a communications device such as a cell phone; a network appliance; a web server; a network; any device capable of manipulating information; a receiver; a transmitter; an interface or any combination of these devices. The location enhancement module 152 may perform additional functionality such as, for example, receiving requests for information, providing data, storing information, commanding actions in response to identifying location information, associating objects with other objects or with locations, interfacing directly with various network types, and the like. The location enhancement module 152 may include multiple distributed receivers, some of which may be connected to a network, while others may not be connected to a network.

The sensor 320 can be placed within the structure 310 in order to detect the location of the object 315. The sensor 320 transmits an observed position data 330 to the location enhancement module 152 where the location of the object 315 can be determined. The location enhancement module 152 operates with a suitable operating system to carry out an enhanced location tracking. The location enhancement module 152 further includes a statistical property module 360, a temporal coherence module 370, and an interpolating and predicting module 380 for providing a refined position data 390. Note that the location enhancement system 300 may be utilized to locate both personnel and objects. Additionally, note that as utilized herein the term temporal coherence generally refers to the velocity and the time of a last observed position that affects the estimate of a next position.

The statistical property module 360 can be programmed to calculate a potential position of the object 315 within the structure 320 utilizing a two-dimensional Gaussian probability distribution function 365. The statistical property module 360 calculates a potential position value $P_i(t)$ and a corresponding probability value $p_i(t)$ utilizing the two-dimensional Gaussian probability distribution function 365 represented as follows:

$$f(x, y) = \frac{1}{\sigma\sqrt{2\pi}} e^{-\left(\frac{(x-x_0)^2}{2\sigma^2} + \frac{(y-y_0)^2}{2\sigma^2}\right)} \quad (1)$$

wherein mean (x0, y0) is the observed position data 330, variance σ is a maximum error, and e is an Euler's constant. The two-dimensional Gaussian probability distribution function 365 is a continuous probability distribution that describes data that clusters around a mean or average.

The temporal coherence module 370 can be programmed to calculate the optimal route between adjacent observed time periods utilizing an A* heuristic search route search module 375. The temporal coherence module 370 also calculates a distance associated with the optimal route utilizing the A* heuristic route search module 375. For example, consider P(t) represents the object location at time t, which can be related to P(t−1), P(t+1) and can also be related to P(t−2), P(t+2), and so on. Temporal coherence is the measure of the average correlation between the values of the position at any pair of time periods separated by a delay T. Various physical properties possess the temporal coherence property such as, for example, location, velocity, moving direction, and so on. The potential position value and the optimal route can be calculated by accessing a preinstalled structure topology data 345 associated with the structure 310. The structure topology data 345 includes information with respect to the location of compartments, cubicles, equipments, etc. associated with the structure. An optimization problem can then be solved to refine the observed position data 330.

The interpolating and predicting module 380 can be programmed to interpolate the position between two observed times and to predict the position of the object 315 before a next observed time utilizing an interpolation method (e.g., a linear interpolation, a polynomial interpolation, a Bezier or NURBS interpolation, etc.) based on spatial constraints 385. The topology information 345 associated with the structure 310 can be preinstalled and the observed position data 330 can be obtained. The spatial constraints 385 are constraints on the route especially inside the structure 310. For example, when a person walks inside the structure, he/she cannot go through the walls or the locked doors. The person can only walk from one compartment (such as rooms, stairs, elevators, cubicle, etc.) to others along the portals (such as the doors, hallways, aisle, and so on). In some cases, such as in an extreme incident environment, the person, such as a firefighter, can go through the wall, but must spend some time to destroy the wall, which can be dealt via the detection of the stopping over. Note that the statistical module 360, the temporal coherence module 370, and the interpolating and predicting module 380, as described herein, can be implemented as mathematical models for calculating the position values, optimal routes, and interpolated and predicted points.

The following description is presented with respect to the disclosed embodiments, which may be embodied in the context of a data-processing system such as data-processing system 100 and computer software system 150 depicted respectively in FIGS. 1-2. The disclosed embodiments, however, are not limited to any particular application or any particular environment. Instead, those skilled in the art will find that the disclosed system and methods may be advantageously applied to a variety of system and application software including database management systems, word processors, and the like. Moreover, the disclosed embodiments may be implemented on a variety of different platforms including Macintosh, UNIX, LINUX, and the like. Therefore, the description of the exemplary embodiments, which follows, is for purposes of illustration and not considered a limitation.

Figure 4:
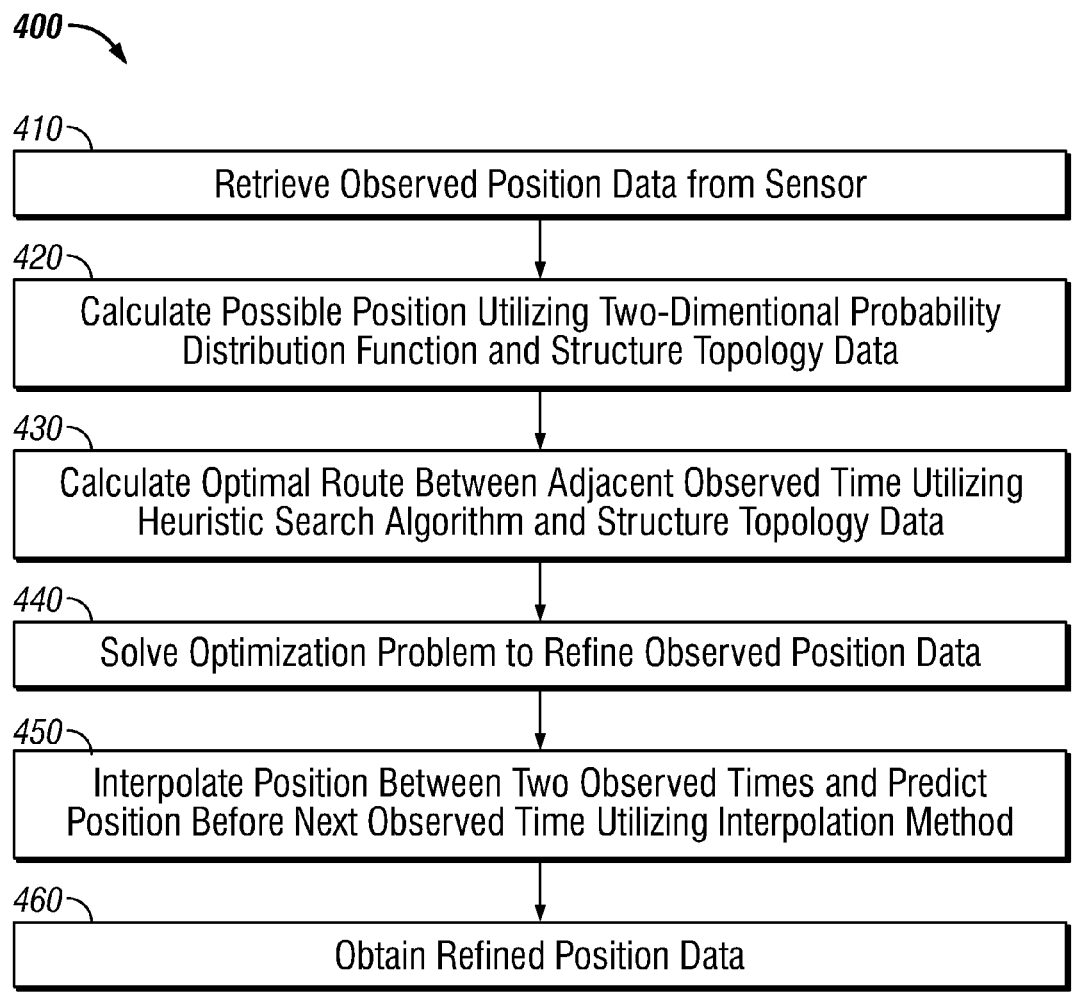
FIG. 4 illustrates a high level flow chart of operation illustrating logical operational steps of a method for enhancing the location system based on topology constraints, in accordance with the disclosed embodiments.

FIG. 4 illustrates a high level flow chart of operation illustrating logical operational steps of a method 400 for enhancing the location system 300 based on topology constraints, in accordance with an embodiment. Note that the process or method 400 described in FIG. 4 can be implemented in the context of a software module such as module 152 depicted in FIG. 2. The observed position data 330 can be initially retrieved from the sensor 320, as illustrated at block 410. The potential position value $P_i(t)$ and the corresponding probability value $p_i(t)$ can be determined with the two dimensional Gaussian probability distribution 365 and the pre-installed structure topology data 345, as depicted at block 420. A circle area can be drawn in accordance with the mean (the observed position $P_0$) as center and the variance (the maximum observing error r) as its radius. The observed position $P_0$ can be obtained from the location system 300. The compartments nearby the position $P_0$ can be obtained from the topology data 345. Then the compartments in which the circle area intersects can be calculated. A sample point Pi can then be selected for each intersected compartments in their intersection part and the probability Pi according to the equation (1) can be calculated.

Figure 5:
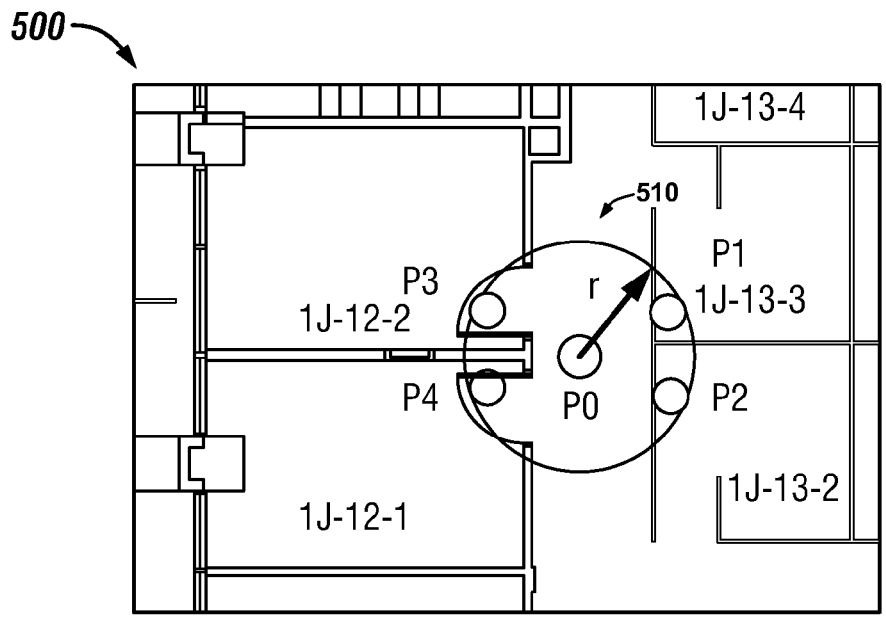
FIG. 5 illustrates a two-dimensional view of compartments illustrating potential position value of an object, in accordance with the disclosed embodiments.

FIG. 5 illustrates a two-dimensional view of the compartments 500 illustrating a potential position value of the object 315, in accordance with an embodiment. As depicted in FIG. 5, $P_0$ is the position data 330 obtained from the sensor 320 and r is the maximum observing error. A circle 510 can be drawn in accordance with the observed position $P_0$ as center and the variance (the maximum observing error r) as its radius. The circle area 510 intersects with four compartments: cubicle 1J-13-3, cubicle 1J-13-2, room 1J-12-2, and room 1J-12-1. The four sample points $P_1$, $P_2$, $P_3$, $P_4$ in their intersection area can be obtained and their corresponding probability $p_0$, $p_1$, $p_2$, $p_3$, $p_4$ can be calculated. As different observed position data 330 at some interval can be obtained, a time variable can be added to the sample points $P_i$ and the probability values $p_i$ to obtain the potential position value $P_i(t)$ and the corresponding probability value $p_i(t)$.

Thereafter, as illustrated at block 430, the optimal route between adjacent observed time can be calculated utilizing A* heuristic route search method 375 and pre-installed structure topology data 345. Generally, the A* heuristic route search method finds the least-cost path from a given initial node to one goal node (out of one or more potential goals) utilizing a distance and a cost heuristic function (usually denoted f(x)) to determine an order in which the search visits nodes in a tree. The A* heuristic route search method initially splits the image 500 of the structure location 310 into grids and indicates any walls and/or cubicles as a red grid with unlimited value and any open spaces where a person can walk as a green grid with some weight value. Hence, the A* algorithm can search the optimal route between any two grids.

Figure 6:
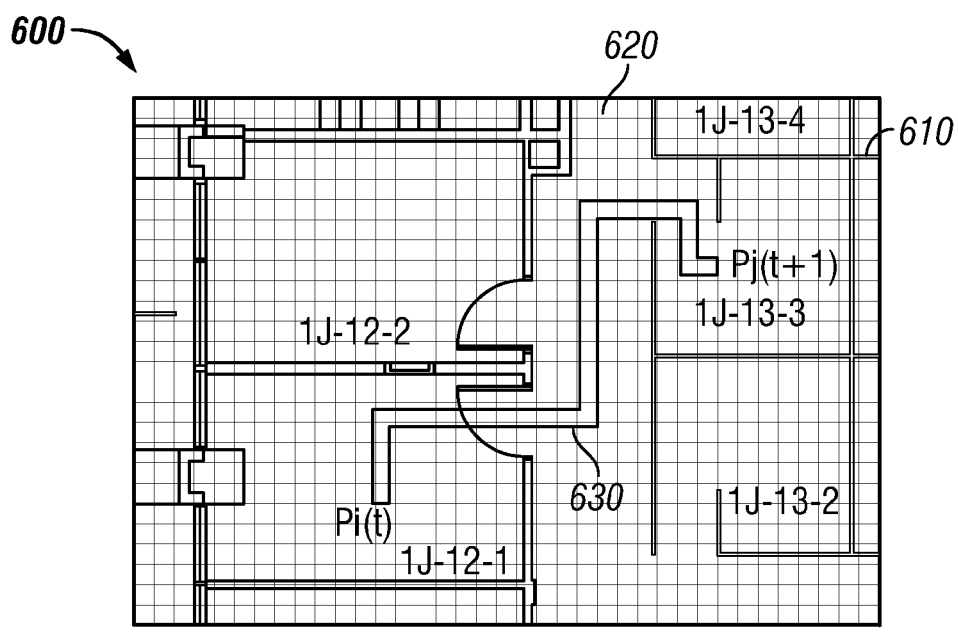
FIG. 6 illustrates a two-dimensional view of compartments split into grids to find an optimal route between any two grids, in accordance with the disclosed embodiments.

FIG. 6 illustrates a two-dimensional floor plan view 600 of the compartments split into grids to find an optimal route between any two grids, in accordance with an embodiment. As depicted in FIG. 6, the walls, cubicles, and the like can be marked as red grids 610 and the open spaces are marked green grids 620. The route length can be calculated once the optimal route is obtained. The route length can be represented as shown below:

$$D(P_i(t), P_j(t+1)) \quad (2)$$

If the total number of intersected areas at time t is L and the number at time t+1 is M, the number of potential optimal routes can be (L+1)*(M+1). The route 630 depicted in FIG. 6 between $P_i(t)$ and $P_j(t+1)$ represent an optimal route.

The optimization problem can be solved to refine the observed position data 330 utilizing the probability value $p_i(t)$ and the distance of the optimal route, as illustrated at block 440. The optimization problem can be solved by initially assuming P(t−1), P(t), P(t+1) as the observed position data 330 from the sensor 320 at time t−1, t, t+1. The potential positions $P_i(t-1)$ at time t−1 with probabilities $p_i(t-1)$ complying with two-dimensional Gaussian statistical property ($0 \leq i \leq L$) can be obtained as described above. Similarly, the potential positions $P_j(t)$ at time t with probabilities $P_j(t)$ ($0 \leq j \leq M$) and potential positions $P_k(t+1)$ at time t+1 with probabilities $p_k(t+1)$ ($0 \leq k \leq N$) can also be obtained. Subsequently, the optimal route between adjacent time t−1 and t and the corresponding length D(Pi(t), $P_j(t+1)$) ($0 \leq i \leq L$, $0 \leq j \leq M$) can be obtained. Similarly, the optimal route between adjacent time t and t+1 and the length D($P_j(t)$, $P_k(t+1)$) ($0 \leq j \leq L$, $0 \leq k \leq M$) can also be obtained. Thereafter, the final optimization problem $P_j(t)$ at time t can be obtained as follows:

$$\arg \operatorname*{Min}_{0 \leq i \leq L, 0 \leq j \leq M, 0 \leq k \leq N} \left( \frac{D(P_i(t-1), P_j(t))}{p_i(t-1) * p_j(t)} + \frac{D(P_j(t), P_k(t+1))}{p_j(t) * p_k(t+1)} \right) \quad (3)$$

The position between two observed time periods can be interpolated and the position before the next observed time can be predicted for accuracy via the interpolation methods, as depicted at block 450. A curve fitting can be performed via interpolation methods such as linear interpolation, polynomial interpolation, Bezier or NURBS interpolation, etc. to interpolate positions between two observed time periods. The position before the next observed time can also be predicted to improve the accuracy. It is important to note that this is not the complete rationale for performing the aforementioned predictions. The problem is that, without the prediction, one would be forced to display an uncorrected location when the next time for an update arrived. Then, as soon as the correction was computed, one would be forced to change that location on the display. The location would "jump" and create confusion for the viewer. The aforementioned prediction operation thus allows for the display of data that is indicative of a location very close to the optimal location when the next time to display an update arrives.

After the curve fitting, the predicted position can be located on the fitting curve. The spatial constraints can also be considered while interpolating and predicting the positions. The refined position data 390 can thus be obtained, as indicated at block 460.

Additionally, the location system 300 can be further improved by applying a second-order Markov property in order to obtain the following optimization problem:

$$\arg \operatorname*{Min}_{0 \leq i \leq L, 0 \leq j \leq M, 0 \leq k \leq N} \left( \frac{D(P_i(t-1), P_a(t-2))}{p_i(t-1) * p_a(t-2)} * q(t-1, t-2) + \right. \quad (4)$$

$$\frac{D(P_i(t-1), P_j(t))}{p_i(t-1) * p_j(t)} * q(t-1, t) + \frac{D(P_j(t), P_k(t+1))}{p_j(t) * p_k(t+1)} * q(t, t+1) +$$

$$\left. \frac{D(P_i(t+1), P_b(t+2))}{p_1(t+1) * p_b(t+2)} * q(t+1, t+2) \right)$$

wherein q is the probability from one state to another state. The moving velocity can be added to equation (3) for amending the optimization problem. Assume V($P_i(t)$, $P_j(t+1)$) to represent the velocity from the point $P_i(t)$ to the point $P_j(t+1)$ along the optimal route. The velocity can be calculated as follows:

$$V(P_i(t), P_j(t+1)) = D(P_i(t), P_j(t+1))/\Delta t \quad (5)$$

wherein $\Delta t$ is interval between the time t and time t+1. The amended optimization problem can be calculated as follows:

$$\arg \operatorname*{Min}_{0 \leq i \leq L, 0 \leq j \leq M, 0 \leq k \leq N} \left\{ \alpha \left( \frac{D(P_i(t-1), P_j(t))}{p_i(t-1) * p_j(t)} + \frac{D(P_j(t), P_k(t+1))}{p_j(t) * p_k(t+1)} \right) + \right. \quad (6)$$

$$\left. \beta | V(P_i(t-1), P_j(t)) - V(P_j(t), P_k(t+1)) | \right\}$$

The moving direction can be added to equation (3) for amending the optimization problem. Assume $\vec{V}(P_i(t),P_j(t+1))$ to represent the direction from the point $P_i(t)$ to the point $P_j(t+1)$ along the optimal route. The direction can be calculated with the following equation:

$$\vec{V}(P_i(t),P_j(t+1))=P_j(t+1)-D(P_i(t)) \quad (7)$$

The amended problem can be calculated as follows:

$$\arg\min_{0\leq i\leq L, 0\leq j\leq M, 0\leq k\leq N}\left\{\alpha\left(\frac{D(P_i(t-1), P_j(t))}{p_i(t-1)*p_j(t)} + \frac{D(P_j(t), P_k(t+1))}{p_j(t)*p_k(t+1)}\right) + \beta\vec{V}(P_i(t-1), P_j(t))\cdot\vec{V}(P_j(t), P_k(t+1))\right\} \quad (8)$$

While the disclosed embodiments have been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. Based on the foregoing, it can be appreciated that a system can be provided, through the use of one or more software modules as described above, which results in a location system. The system herein also utilizes the topology constraints for providing the refined position data.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for enhanced location tracking, said method comprising:
    determining by a processor at least one potential position value and a corresponding probability value with respect to observed position data of an object utilizing a normal probability distribution function and a structure topology data by implementing a circle in association with said observed position data as a center and a variance with respect to a radius in order to thereafter calculate at least one compartment intersecting said circle and selecting a sample point with respect to said at least one compartment intersecting said circle in association with an intersection part in order to calculate said probability value based on said probability distribution function;
    calculating by a processor an optimal route and a length of said optimal route between adjacent time periods based on said structure topology data in order to thereafter solve an optimization problem to refine said observed position data; and
    interpolating by a processor said at least one potential position value between a pair of observed position values in order to predict a position of said object at an adjacent observed time period based on a spatial constraint and thereby effectively locate and track said object based on said structure topology data.

2. The method of claim 1 further comprising predicting said position of said object before said adjacent observed time based on said spatial constraint in response to interpolating said at least one potential position value at the next observed time period.

3. The method of claim 1 further comprising pre-installing said structure topology data to obtain said potential position value and said optimal route.

4. The method of claim 1 further comprising adding a time variable to said at least one potential position value and said probability value.

5. The method of claim 1 wherein calculating said optimal route between adjacent times based on said structure topology data, further comprises:
    implementing a heuristic route search in order to split an image obtained from said structure topology data into a plurality of grids; and
    analyzing said optimal route between at least two grids.

6. The method of claim 1 further comprising refining said observed position data utilizing said probability value and a route length associated with said optimal route.

7. The method of claim 1 wherein interpolating said at least one potential position between said pair of observed time period, further comprises:
    obtaining said position between said pair of observed time periods utilizing a curve fitting process and a fitting curve thereof; and
    locating said predicted position on said fitting curve.

8. A system for enhanced location tracking, said system comprising:
    a processor;
    a data bus coupled to said processor; and
    a computer-usable medium embodying computer code, said computer-usable medium being coupled to said data bus, said computer program code comprising instructions executable by said processor and configured for:
    determining at least one potential position value and a corresponding probability value with respect to observed position data of an object utilizing a normal probability distribution function and a structure topology data by implementing a circle in association with said observed position data as a center and a variance with respect to a radius in order to thereafter calculate at least one compartment intersecting said circle and selecting a sample point with respect to said at least one compartment intersecting said circle in association with an intersection part in order to calculate said probability value based on said probability distribution function;
    calculating an optimal route and a length of said optimal route between adjacent time periods based on said structure topology data in order to thereafter solve an optimization problem to refine said observed position data; and
    interpolating said at least one potential position value between a pair of observed position values in order to predict a position of said object at an adjacent observed time period based on a spatial constraint and thereby effectively locate and track said object based on said structure topology data.

9. The system of claim 8 wherein said instructions are further configured for predicting said position of said object before said adjacent observed time based on said spatial constraint in response to interpolating said at least one potential position value at the next observed time period.

10. The system of claim 8 wherein said instructions are further configured for adding a time variable to said at least one potential position value and said probability value.

11. The system of claim 8 wherein said instructions for calculating said optimal route between adjacent times based on said structure topology data, are further configured for:
   implementing a heuristic route search in order to split an image obtained from said structure topology data into a plurality of grids; and
   analyzing said optimal route between at least two grids.

12. The system of claim 8 wherein said instructions are further configured for refining said observed position data utilizing said probability value and a route length associated with said optimal route.

13. The system of claim 8 wherein said instructions for interpolating said at least one potential position between said pair of observed time period, are further configured for:
   obtaining said position between said pair of observed time periods utilizing a curve fitting process and a fitting curve thereof; and
   locating said predicted position on said fitting curve.

14. A non-transitory computer-usable medium for enhanced location tracking, said computer-usable medium embodying computer program code, said computer program code comprising computer executable instructions configured for:
   determining at least one potential position value and a corresponding probability value with respect to observed position data of an object utilizing a normal probability distribution function and a structure topology data by implementing a circle in association with said observed position data as a center and a variance with respect to a radius in order to thereafter calculate at least one compartment intersecting said circle and selecting a sample point with respect to said at least one compartment intersecting said circle in association with an intersection part in order to calculate said probability value based on said probability distribution function;
   calculating an optimal route and a length of said optimal route between adjacent time periods based on said structure topology data in order to thereafter solve an optimization problem to refine said observed position data; and
   interpolating said at least one potential position value between a pair of observed position values in order to predict a position of said object at an adjacent observed time period based on a spatial constraint and thereby effectively locate and track said object based on said structure topology data.

15. The non-transitory computer-usable medium of claim 14 wherein said embodied computer program code further comprises computer executable instructions configured for:
   predicting said position of said object before said adjacent observed time based on said spatial constraint in response to interpolating said at least one potential position value at the next observed time period; and
   pre-installing said structure topology data to obtain said potential position value and said optimal route.

16. The non-transitory computer-usable medium of claim 14 wherein said embodied computer program code further comprises computer executable instructions configured for:
   adding a time variable to said at least one potential position value and said probability value;
   implementing a heuristic route search in order to split an image obtained from said structure topology data into a plurality of grids; and
   analyzing said optimal route between at least two grids.

17. The non-transitory computer-usable medium of claim 14 wherein said embodied computer program code further comprises computer executable instructions configured for:
   refining said observed position data utilizing said probability value and a route length associated with said optimal route;
   obtaining said position between said pair of observed time periods utilizing a curve fitting process and a fitting curve thereof; and
   locating said predicted position on said fitting curve.

* * * * *